(12) United States Patent
Min

(10) Patent No.: US 6,411,288 B1
(45) Date of Patent: Jun. 25, 2002

(54) FOLD-DOWN FLAT PANEL DISPLAY DEVICE

(75) Inventor: Yoon-ki Min, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/222,828

(22) Filed: Dec. 30, 1998

(30) Foreign Application Priority Data

Dec. 31, 1997 (KR) .............................................. 97-44812

(51) Int. Cl.$^7$ ................................................ G09G 5/00
(52) U.S. Cl. ......................... 345/204; 345/2; 345/168; 345/902; 345/905; 361/179; 361/681; 361/682
(58) Field of Search ........................... 345/2, 902, 905, 345/168, 204, 169; 361/179, 681, 682

(56) References Cited

U.S. PATENT DOCUMENTS

| | | | | |
|---|---|---|---|---|
| 5,898,600 A | * | 4/1999 | Isashi | 345/169 |
| 6,016,248 A | * | 1/2000 | Anzai et al. | 361/683 |
| 6,040,811 A | * | 3/2000 | Malhi | 345/87 |
| 6,046,754 A | * | 4/2000 | Stanek | 345/905 |
| 6,094,341 A | * | 7/2000 | Lin | 345/905 |

* cited by examiner

Primary Examiner—Richard Hjerpe
Assistant Examiner—Ali Zamani
(74) Attorney, Agent, or Firm—Staas & Halsey LLP

(57) ABSTRACT

A flat panel display device including a panel unit for displaying an image, a main body unit controlling an image displayed on the panel unit, and a folder connecting the panel unit and the main body unit.

8 Claims, 3 Drawing Sheets

FOLD-DOWN FLAT PANEL DISPLAY DEVICE

CROSS-REFERENCE TO RELATED APPLICATIONS

This application makes reference to, incorporates the same herein, and claims all benefits accruing under 35 U.S.C. §119 from my utility model application entitled Device for *Flat Panel Display Apparatus with Compounded Multifunction* filed with the Korean Industrial Property Office on Dec. 31, 1997 and their duly assigned Serial No. 97-44812 by that Office.

BACKGROUND OF THE INVENTION

1. Field of the Invention

The present invention relates to a multifunctional flat panel display device, and more particularly, relates to a fold-down flat panel display device divided into a display unit and a controller and used as a stand type or a wall tapestry type and having a flexible folder connecting the display unit to the controller.

2. Description of the Related Art

Generally, there are two kinds of flat panel display devices, one is a stand type which a user operates on a desk or other surface and the other one is a wall tapestry type which is hung on a wall.

That is, conventional flat panel display devices as a stand type or wall tapestry type are supposed to be used to perform their own distinct functions. Accordingly, these flat panel display devices are not sufficient for contemporary tendencies and usages, for example, a meeting via a display screen or a personal use.

SUMMARY OF THE INVENTION

Accordingly, the present invention is designed to overcome the drawbacks described as above, and an object of the present invention is to provide a flat panel display device with a composite multifunction, which is separated into a display unit and a power unit and can be used as a stand type to rest on a surface or a wall tapestry type to be hung on a wall.

Additional objects and advantages of the invention will be set forth in part in the description which follows and, in part, will be obvious from the description, or may be learned by practice of the invention.

To achieve the above and other objects of the present invention, a flat panel display device is provided which includes a liquid crystal display panel for displaying an image, a power unit at a lower end of the liquid crystal display panel, and a display unit having a volume element, for adjusting volume corresponding to the displayed image; a PCB board, a power circuit, an interface port for connecting peripheral equipment and plural jacks are inside a controller unit to which a supporting board is attached to support the display unit at a side when the flat panel display device is to be used as a stand type, and a flexible folder unit, which is a connecting member, which connects the display unit and the controller unit.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
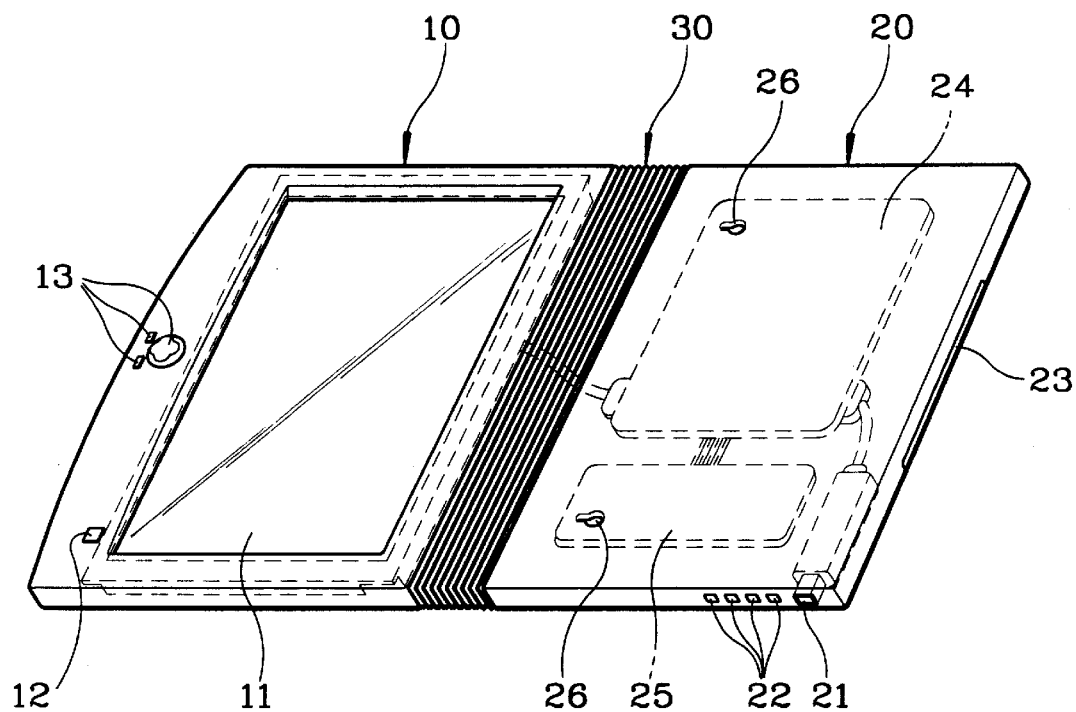
FIG. 1 is a perspective view of a flat panel display device according to an embodiment of the present invention.

Reference will now be made in detail to the present preferred embodiment of the present invention, examples of which are illustrated in the accompanying drawings, wherein like reference numerals refer to like elements throughout. In the following description, well known functions and constructions which may obscure the present invention are not described in detail.

Figure 2:
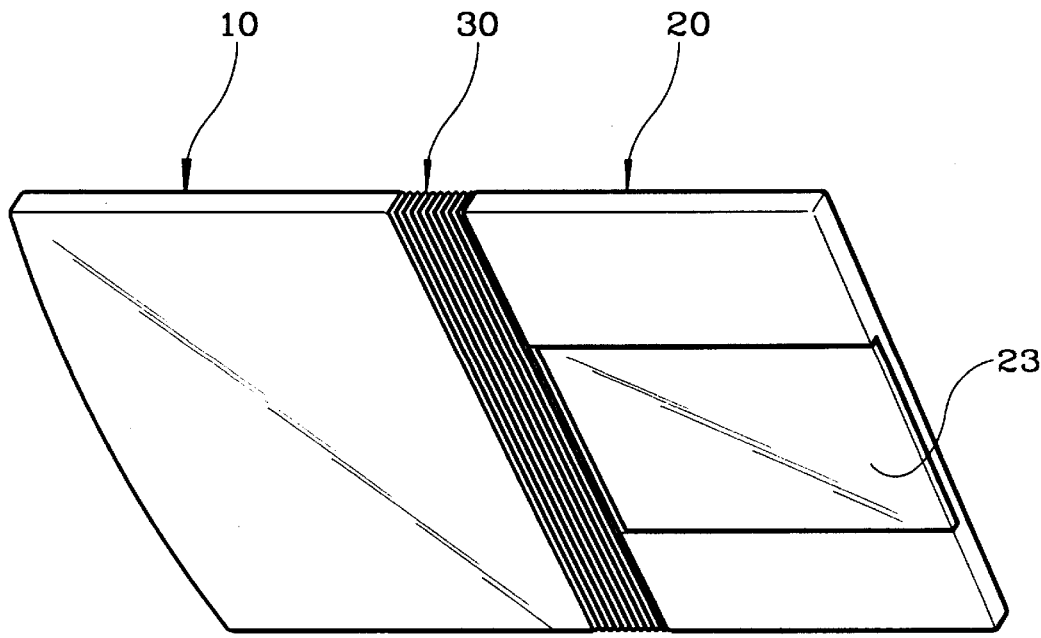
FIG. 2 is a rear view of the flat panel display device shown in FIG. 1.

Referring to FIGS. 1 and 2, a flat panel display device according to an embodiment of the present invention includes a display unit 10 for displaying images, and a controller 20 equipped with an interface port 21 for connecting a PCB board 24, a control circuit for displaying the images on the display unit which have been received from peripheral equipment.

Also, a connecting member which connects the display unit 10 and the controller 20 is formed with a flexible folder 30, and the flexible folder 30 is formed with folds.

That is, the display unit 10 is equipped with a flat display screen 11 displaying images, a power switch 12 for turning on/off, the flat panel display device and a volume element 13 for controlling the volume relating to the images displayed on the flat display screen 11 at a vessel plate of a lower part of the flat display screen 11. The flat display screen 11 is a liquid crystal display screen.

The PCB board 24, which includes a circuit to control image signals corresponding the images displayed on the flat display screen 11 and other signals, is formed inside of the controller 20, and an electric source circuit 25 which transfers external electric power to be used to power the flat panel display device is also formed inside the controller 20. A pair of grooves for wall tapestry 26 is formed in the top surface of the controller 20 to enable the flat panel display device to be hung from a wall as described later on.

Figure 3:
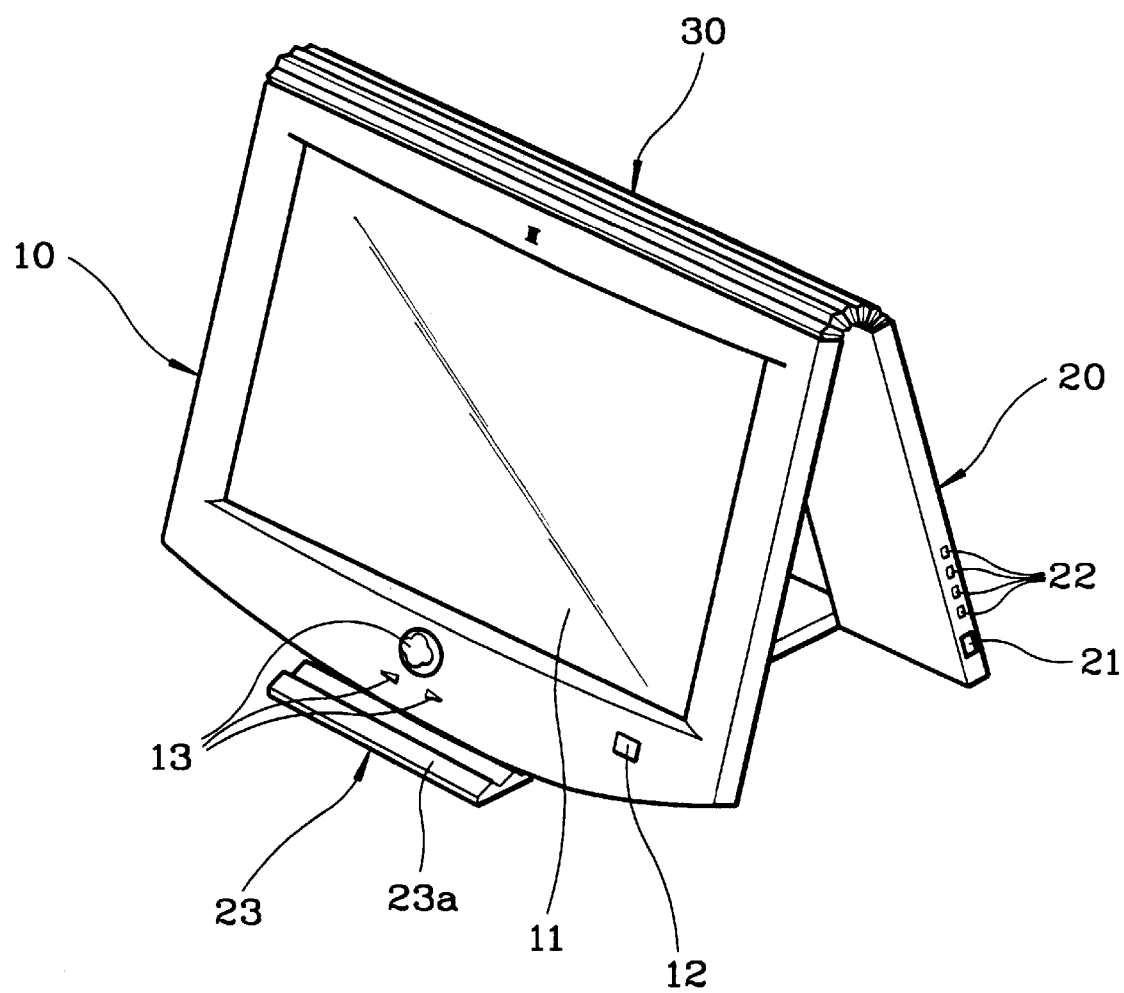
FIG. 3 is a perspective view of the flat panel display device shown in FIG. 1 in a stand type state (a first, partially folded, state)

The interface port 21 and a plural jack 22 are formed at an end side of the controller 20, for connecting to peripheral equipment. The supporting board 23 is rotatable to a first position which engages a cutaway portion at the back of the controller 20, and to a second position outside of the cutaway portion so as to rest on a surface when the flat panel display device is in the stand type state. As shown in FIG. 3, a plural engagement chin 23a, having a number of engagements, for supporting the display unit 10 is formed on the supporting board 23 protruded from the rear of controller 20 when a stand type configuration is used.

The flexible folder 30 enables a front surface of the display unit 10 to contact a front surface of the controller 20, and a back surface of the display unit 10 to contact a back surface of the controller 20.

As described above, the flat panel display device according to the embodiment of the present invention is used as a stand type or wall tapestry type.

Figure 4:
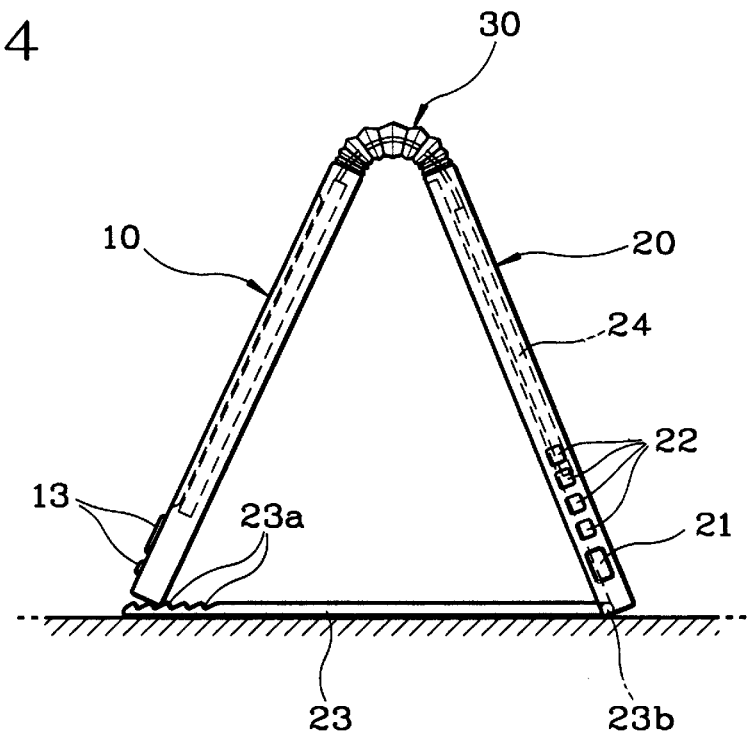
FIG. 4 is a side view showing the stand type state of the flat panel display device shown in FIG. 1.

That is, FIGS. 3 and 4 show a perspective view and a side view of, respectively, the flat panel display device as a stand type. In this case, the supporting board 23 is withdrawn from the cutaway portion of the back of the controller 20 and the display unit 10 is inserted into one of the engagements of the plural engagement chin 23a of the supporting board 23 formed on the controller 20. The display unit 10, the controller 20 and the supporting board 23 form a triangular shape at this time. The flexible folder 30 of the flat panel display device including the display unit 10 and the controller 20 is rotated in a clockwise direction and the supporting board 23 formed on the rear of the controller 20 is folded down. The angle of orientation of the display unit 10 may be adjusted depending upon into which one of the engagements the end of the display unit 10 away from the flexible folder 30 is inserted.

In case the supporting board 23 is folded down and the display unit 10 is inserted into the plural engagement chin 23a formed on the supporting board 23 according to a required angle, the flat panel display device is locked by the plural engagement chin 23a into one of the engagements by forming a stabilized triangular shape.

As a result, the flat panel display device is used as a stand type in this instance, because the display unit 10 is settled in the supporting board 23 formed on the controller 20.

Figure 5:
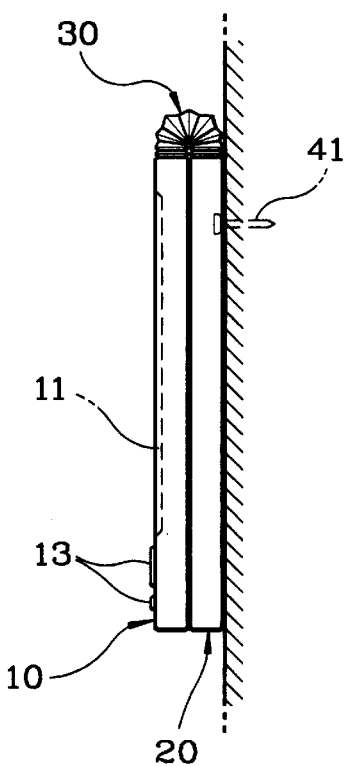
FIG. 5 is a side view showing a wall tapestry state (a second, fully folded, state) of the flat panel display device shown in FIG. 1.

FIG. 5 shows a state in which the flat panel display device is used as a wall tapestry. To place the flat panel display device in the wall tapestry state from the stand type state, the display unit 10 is detached from the plural engagement chin 23a and the supporting board 23 is rotated into the cutaway portion at the back of the controller 20, so that the back surface of the controller 20 is flat (the back surface of the support board 23 being coincident with the back surface of the controller 20). The display unit 10 is rotated (counter clockwise from the state shown in FIG. 4) about the flexible folder 30, which bends, until the back of the display unit 10 is in contact with the back of the controller 20. FIG. 5 shows the flat panel display device in the wall tapestry state, such that the supporting board 23 has already been received within the cutaway portion of the back of the controller 20 after the display unit 10 is detached from the engagement chin 23a of the supporting board 23, and the back surfaces of the display unit 10 and the controller 20 are completely in contact.

In the wall tapestry state shown in FIG. 5, nails or other protrusions extending from a wall may be inserted into the grooves for wall tapestry 26 formed on the front of the controller 20 of the flat panel display device.

Therefore, as above described, the flat panel display device according to the present invention is used optionally according to a necessity of a user as a flat panel display device for standing on a surface and a flat panel display device for hanging on a wall.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A flat panel display device comprising:
a panel unit to display an image;
a main body unit controlling the image displayed on said panel unit; and
a folder, formed with folds, connecting said panel unit and main body unit, to enable said panel unit to rotate relative to said main body unit, wherein said main body unit comprises a groove formed on a front surface thereof and engageable with a protrusion to enable the flat panel display to hang from the protrusion when the protrusion engages the groove.

2. The device as claimed in claim 1, wherein said main body unit comprises a hinge-operating supporting board, said hinge-operating supporting board being rotatable to a first position against a back surface of said main body unit and to a second position away from the back surface of said main body unit to form a stand for the flat panel display device.

3. The device as claimed in claim 2, wherein said main body unit has a back surface with a cutaway portion, and when said hinge-operating supporting board is at the first position, the hinge-operating supporting board engages the cutaway portion so that the back surface of said main body unit is coincident with a back surface of said hinge-operating supporting board.

4. The device as claimed in claim 2, wherein main body unit, said panel unit and said hinge-operating supporting board forming a triangular shape when said hinge-operating supporting board is at the second position.

5. A flat panel display device comprising:
a panel unit to display an image;
a main body unit controlling the image displayed on said panel unit; and
a folder, formed with folds, connecting said panel unit and main body unit, to enable said panel unit to rotate relative to said main body unit,
wherein said main body unit comprises a hinge-operating supporting board, said hinge-operating supporting board rotatable to a first position against a back surface of said main body unit and to a second position away from the back surface of said main body unit to form a stand for the flat panel display device, and
wherein said main body has a back surface with a cutaway portion, and when said hinge-operating supporting board is at the first position, the hinge-operating supporting board engages the cutaway portion so that the back surface of said main body unit is coincident with a back surface of said hinge-operating supporting board.

6. A display device comprising:
a display unit having a display screen to display an image;
a controller having control circuitry to control the image on the display screen in response to external signals;
a folder, formed with folds, connecting said display unit to said controller, wherein said folder enables said display screen of said display unit to be rotated greater than 180 degrees relative to said controller; and
a supporting board attached to a back surface of said controller, and rotatable away from said back surface to form a stand which engages a first end of said display unit opposite to a second end of said display unit which is connected to said folder to support said display unit at an angle, away from said supporting board,
wherein said controller has a back surface with a cutaway portion, said supporting board is rotatable to be received within said cutaway portion at a designated position to enable a back surface of said display unit to contact the back surface of said controller, and said controller has a front surface with a groove to receive a protrusion, enabling the display to hang while the supporting board is at the designated position.

7. A display device comprising:

a display unit having a display screen to display an image;

a controller having control circuitry to control the image on the display screen in response to external signals; and a folder, formed with folds, connecting said display unit to said controller, wherein said folder enables said display screen of said display unit to be rotated greater than 180 degrees relative to said controller, wherein said supporting board has a plurality of engagements to selectively receive the first end of said display unit, to adjust an angle of the display screen relative to a surface on which the supporting board rests.

8. A panel device comprising:

a panel unit; and a main body unit comprising a hinge-operating supporting board, said hinge-operating supporting board rotatable to a first position away from a back surface of said main body unit to form a stand for the flat panel display device, wherein said hinge-operating supporting board is further rotatable to a second position against a back surface of said main body unit.

* * * * *